Nov. 29, 1932.    C. COHEN-VENEZIAN    1,889,350
AEROFOIL CARRYING RACK

Filed May 21, 1930

Inventor:
Carlos Cohen-Venezian
by
Attys.

Patented Nov. 29, 1932

1,889,350

UNITED STATES PATENT OFFICE

CARLO COHEN-VENEZIAN, OF TURIN, ITALY

AEROFOIL-CARRYING RACK

Application filed May 21, 1930, Serial No. 454,437, and in Italy May 28, 1929.

It is known that the operation of carrying and handling aircraft wings or planes on vehicles is of a delicate character because such wings must be engaged and supported in register with well defined points, that is in register with joints of their structure consisting of spars and ribs, to avoid any damage to said structure and to fabric enclosing it.

Therefore it is necessary to use a particular support for each type of wing, this requirement being particularly heavy when wings of different constructions are to be carried on vehicles.

This invention provides for removing such a drawback and comprises adjustable means which are able to hold wings or planes of different constructions in position by engaging them in register with most appropriate points of their structure.

The means of this invention are adapted to be arranged on vehicles generally, as road motor vehicles and trailers and railway vehicles.

Figure 1:
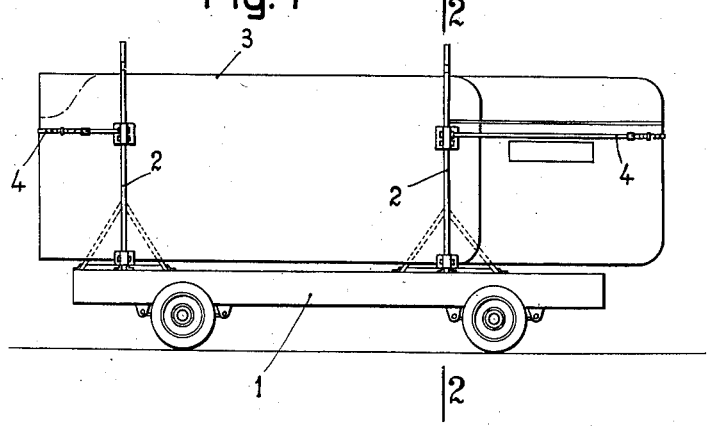
Figure 2:
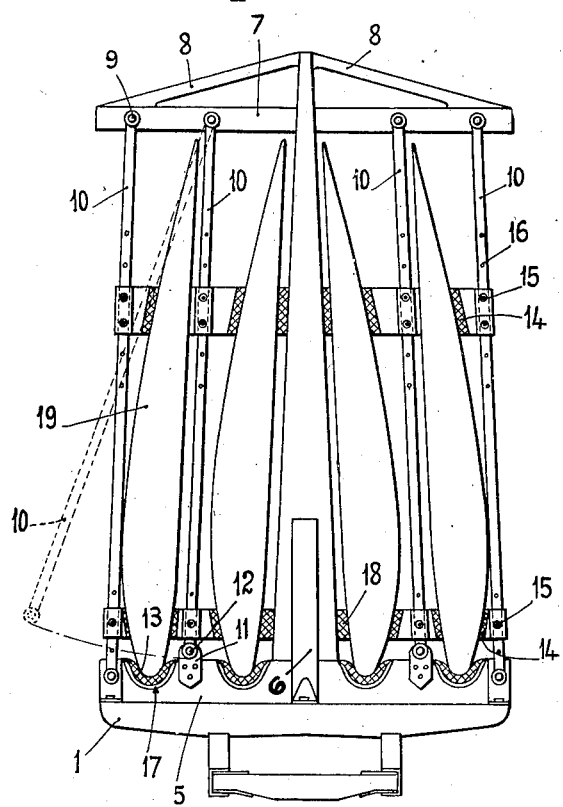

An embodiment of this invention is illustrated by way of example on the annexed drawing and Figure 1 is a side view of a road vehicle equipped with means according to this invention;

Figure 2 is a section of the same on line 2—2 of Figure 1 to an enlarged scale with parts omitted.

As shown in said drawing, on a wheeled vehicle chassis 1 are located transverse support frames, each referenced in its whole by 2, in which aeroplane wings 3 are arranged vertically with their length parallel with the longitudinal axis of the vehicle; said wings 3 are engaged in supporting frames 2 by any suitable means as straps 4.

As shown more particularly in Figure 2, each support frame 2 comprises a bottom transverse bar 5 from which a central upright 6 extends, said upright carrying at its top a horizontal transverse bar 7 which has strengthening ties 8.

Rods 10 are fulcrumed at 9 on said bar 7, and the bottom ends of said rods 10 are adapted to be engaged with bottom transverse bar 5 by means of forks 11 fastened on and extending from bar 5 and locking pins 12 inserted in cooperating holes of rods 10 and forks 11.

Transverse bar 5 is provided with depressions 17 lined with soft pads 13 intermediate several forks 11.

Each of said rods 10 has shoes 14 mounted to move therealong, each of said shoes being able of being separately fastened in any desired position along cooperating rod 10 by means of bolts 15 adapted to be inserted into registering holes of said shoes and any of a plurality of holes 16 of rods 10.

Upright 6 is providel with pads as 18 on its opposite side faces, said pads 18 being if desired adjustable along said upright.

In operation, to fasten wings on a carriage equipped as above described, pins 12 are firstly removed and rods 10 are swung as shown in dotted lines in Figure 2, and then wings as 19 are positioned with their edges resting on bottom pads 13 of transverse bar 5. Then rods 10 are carried again in position and locked therein by means of pins 12.

Shoes 14 are now shifted along rods 10 to carry them in position to engage and fasten wings 19 and finally said shoes are locked in position by means of bolts 15.

By the described arrangement, aeroplane wings or planes of different sizes and characters may be fastened in position on a vehicle, shoes 14 being able of being replaced by other ones of different thickness or size or having adjustable or removable shims or pads to cause them to engage wings at most appropriate points of their structure.

What I claim as my invention and desire to secure by United States Letters Patent is:

1. Means for carrying aircraft planes and wings, comprising a number of supporting structures, rods extending across each of said structures and having one end pivotally connected therewith, means for releasably locking the opposite end of each rod on its cooperating structure, and means on each rod for engaging wings in position.

2. Means for carrying aircraft planes and wings, comprising a number of supporting structures, rods extending across each of said structures and having one end pivotally connected therewith, means for releasably locking the opposite end of each rod on its cooperating structure, and means adjustable along each rod for engaging wings in position.

3. Means for carrying aircraft planes and wings, comprising a number of supporting structures each consisting of a bottom member, an upright extending from said member and a top member supported by said upright above said bottom member, rods each having one end pivotally connected with one of said members, cooperating fastening means on the other one of said members and registering end of each of said rods, wing-engaging shoes adjustable along each of said rods, and means for fastening each of said shoes in selected position on the rod carrying it.

4. Means for carrying aircraft planes and wings, comprising a number of supporting structures each consisting of a bottom member having wing-edge engaging seats in its top edge, pads in said seats, an upright extending from said member and a top member supported by said upright above said bottom member, rods each having one end pivotally connected with one of said members, cooperating fastening means on the other one of said members at the sides of each of said seats, and registering end of each of said rods, wing-engaging shoes adjustable along each of said rods, and means for fastening each of said shoes in selected position on the rod carrying it.

5. Means for carrying aircraft planes and wings, comprising a base, bottom supporting means on said base, rods mounted on said bottom supporting means each extending in a substantially vertical direction, said rods being arranged at a distance from each other in the transverse direction of the base, wing and plane engaging shoes adjustably mounted on said rods on the sides of said rods facing the space between them, and means for fastening said shoes in selected position on said rods.

6. Means for carrying aircraft planes and wings, comprising a base, bottom supporting means on said base, transverse series of substantially vertical rods mounted on said bottom supporting means, each series comprising at least two rods, wing and plane engaging shoes adjustably mounted on said rods on the sides of said rods facing the space between them, and means for fastening said shoes in selected position on said rods.

7. Means for carrying aircraft planes and wings, comprising a base, bottom supporting means on said base, transverse series of substantially vertical rods movably mounted on said bottom supporting means, wing and plane engaging shoes adjustably mounted on said rods on the sides of said rods facing the space between them, and means for fastening said shoes in selected position on said rods.

8. Means for carrying aircraft planes and wings, comprising a base, rods each extending in a substantially vertical direction above said base, said rods being arranged at a distance from each other in the transverse direction of the base, wing and plane engaging shoes adjustably mounted on said rods on the sides of said rods facing the space between them and means for fastening said shoes in selected position on said rods.

In testimony whereof I have signed my name to this specification.

CARLO COHEN-VENEZIAN.